United States Patent
Tada et al.

(10) Patent No.: US 11,313,806 B2
(45) Date of Patent: Apr. 26, 2022

(54) DEFECT INSPECTION METHOD AND DEFECT INSPECTION DEVICE

(71) Applicant: The Yokohama Rubber Co., LTD., Tokyo (JP)

(72) Inventors: Hirotaro Tada, Hiratsuka (JP); Akihiko Sugiura, Toyohashi (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/634,116

(22) PCT Filed: Jul. 25, 2018

(86) PCT No.: PCT/JP2018/027998
§ 371 (c)(1),
(2) Date: Jan. 24, 2020

(87) PCT Pub. No.: WO2019/022170
PCT Pub. Date: Jan. 31, 2019

(65) Prior Publication Data
US 2020/0173933 A1    Jun. 4, 2020

(30) Foreign Application Priority Data

Jul. 26, 2017 (JP) .............................. JP2017-144524

(51) Int. Cl.
*G01N 21/88* (2006.01)
*G01N 21/952* (2006.01)

(52) U.S. Cl.
CPC ..... *G01N 21/8851* (2013.01); *G01N 21/8803* (2013.01); *G01N 21/8806* (2013.01);
(Continued)

(58) Field of Classification Search
CPC ....... G01N 2021/8861; G01N 21/8803; G01N 21/8851; G01N 21/952; G01N 2021/8883;
(Continued)

(56) References Cited

U.S. PATENT DOCUMENTS

| | | |
|---|---|---|
| 2002/0090129 A1 | 7/2002 | Ikegaya et al. |
| 2011/0182496 A1 | 7/2011 | Sakai et al. |

(Continued)

FOREIGN PATENT DOCUMENTS

| | | |
|---|---|---|
| CN | 101449149 | 6/2009 |
| CN | 101996405 | 3/2011 |

(Continued)

OTHER PUBLICATIONS

International Search Report for Internarial Application No. PCT/JP2018/027998 dated Oct. 16, 2018, 4 pages, Japan.

(Continued)

*Primary Examiner* — Tri T Ton
(74) *Attorney, Agent, or Firm* — Thorpe North & Western

(57) ABSTRACT

A defect image including a defect and a defect-free image not including a defect for an article different from an inspection article are acquired to teach an identifier when inspecting for a defect in the inspection article. The identifier that has learned the images is made to identify whether an extracted inspection image obtained by segmenting the inspection image of the inspection article includes the defect and the identification results of the identifier are used to determine whether a defect is present in the inspection article. When teaching the identifier the defect, the identifier is provided with, as learning images, a plurality of extracted defect images generated from the defect image by changing an extracting region for extraction from the defect image (Continued)

such that the defect in the defect image is at a different position in each of the plurality of extracted defect images.

15 Claims, 10 Drawing Sheets

(52) U.S. Cl.
CPC ... *G01N 21/952* (2013.01); *G01N 2021/8816* (2013.01); *G01N 2021/8861* (2013.01)

(58) Field of Classification Search
CPC .............. G01N 21/88; G01N 21/9515; G01N 2021/8816; G01N 21/8806; G06T 2207/20081; G06T 7/00; G06T 7/0004
USPC .............. 356/237.1–237.6, 239.1–239.8
See application file for complete search history.

(56) References Cited

U.S. PATENT DOCUMENTS

| | | | |
|---|---|---|---|
| 2011/0299760 A1* | 12/2011 | Harada | G01N 23/2251 382/145 |
| 2013/0140457 A1* | 6/2013 | Minakawa | G06T 7/0004 250/307 |
| 2015/0332445 A1 | 11/2015 | Harada et al. | |
| 2018/0089818 A1 | 3/2018 | Kobayashi | |
| 2018/0172557 A1 | 6/2018 | Tyre | |

FOREIGN PATENT DOCUMENTS

| | | |
|---|---|---|
| CN | 104903712 | 9/2015 |
| JP | H06-231257 | 8/1994 |
| JP | 2002-109514 | 4/2002 |
| JP | 2005-156334 | 6/2005 |
| JP | 2010-048730 | 3/2010 |
| JP | 2016-062524 | 4/2016 |
| JP | 2018-054375 | 4/2018 |
| WO | WO 2010/024064 | 3/2010 |
| WO | WO 2014/119124 | 8/2014 |
| WO | WO 2017/001969 | 1/2017 |

OTHER PUBLICATIONS

T. Funahashi, et al., (2014), Tire Visual Inspection of Exterior Thin Defects, Journal of the Japan Society for Precision Engineering, 80.12, pp. 1200 to 1205, 6 pages, Japan.

H. Koshimizu et al., (2010), Method for Inspecting External Appearance for Automobile Tires, SSII2010 16th Symposium on Sensing via Image Information, DS2-08, 4 pages, Japan.

Brownlee; "Image Augmentation for Deep Learning With Keras—Machine Learning Mastery;" [Blog]; machinelearningmastery.com; (Jun. 29, 2016); 14 pages; [retrieved on May 5, 2021]; Retrieved from <URL: https://machinelearningmastery.com/image-augmentation-deep-learning-keras/ >.

Yapi et al.; "A Learning-Based Approach for Automatic Defect Detection in Textile Images;" International Federation of automatic control (IFAC )—PapersOnLine; (2015); pp. 2423-2428; vol. 48, No. 3.; <doi: 10.1016/j.ifacol.2015.06.451 >.

Yi et al.; An End-to-End Steel Strip Surface Defects Recognition System Based on Convolutional Neural Networks; Steel Research International; (Feb. 2016); pp. 1600068 (12 pages); vol. 88, No. 2; <doi: 10.1002/srin.201600068 >.

* cited by examiner

DEFECT INSPECTION METHOD AND DEFECT INSPECTION DEVICE

TECHNICAL FIELD

The present technology relates to a defect inspection method and a defect inspection device for inspecting a defect in an article through the use of an identifier that identifies an image of a defect in an inspection image of the article.

BACKGROUND ART

In the related art, a tire after manufacture is inspected by an inspector to determine if the tire has any defects. During this inspection, the inspector touches or looks at the outer and inner surfaces of the tire. This inspection is performed for all manufactured tires. In this inspection, the presence of a defect is determined according to defined prescribed dimensions of defects at each portion of the tire and for each cause of a defect. For tires with defects that cannot be quantified, a limit sample is made and the tire is compared to the limit sample to determine the presence of a defect. Some tires that are determined to have no defects and pass an inspection by an inspector actually include a "pseudo-defect" that is similar to a defect but not classified as a defect due to not meeting the prescribed dimensions or other reasons.

In recent years, there has been a demand to automate the tasks of imaging the entire tire outer surface and tire inner surface and identifying images of a defect to reduce the amount of work performed by an inspector.

One known method for extracting outer surface characteristics is designed to determine the presence of a thin, wide defect on a tread (tire ground contact surface) surface on the outer surface of a tire through image processing that removes a tire groove portion known as a tread pattern (see T. Funahashi, et al., (2014), *Tire Visual Inspection of Exterior Thin Defects*, Journal of the Japan Society for Precision Engineering, 80.12, pp. 1200 to 1205). In this case, the defect has a protruding elliptical shape with a thickness of 0.4 mm and an area of 100 $mm^2$.

Another known method is designed to detect a defect on the inner surface of a tire by identifying and excluding a periodic pattern on the inner surface of the tire through devising a lighting environment and an image processing system using LED lighting and an area camera, respectively, as imaging units (see H. Koshimizu et al., (2010), *Method for Inspecting External Appearance for Automobile Tires*, SSII2010 16th Symposium on Sensing via Image Information, DS2-08).

When determining defects as described above, a defect identification algorithm can be created to identify different background patterns and certain types of defects in images of different articles. While this algorithm can accurately identify certain types of defects, it cannot effectively identify a wider variety of defects unlike in inspections performed by an inspector. It is also difficult for the algorithm to identify pseudo-defects.

SUMMARY

Inspecting for a wide variety of defects rather than only certain types of defects is important when inspecting both tires and general goods.

The present technology provides a defect inspection method and a defect inspection device for an article that can efficiently identify various types of defects formed on the surface of an article, and not only certain types of defects on the surface of an article as in the related art.

One aspect of an embodiment of the present invention is a defect inspection method for inspecting a defect in an inspection article through use of an identifier that is configured to identify an image of a defect in an inspection image of the inspection article. The defect inspection method includes: acquiring a defect image of an article different from an inspection article and a defect-free image of the article different from the inspection article in order to teach the identifier, the defect image including an image of a defect, and the defect-free image not including the image of a defect; teaching the identifier the image of a defect and an image of a non-defect that is not the defect using the defect image and the defect-free image; causing the identifier that has learned the image of a defect and the image of a non-defect to identify whether each of extracted inspection images obtained by segmenting the inspection image of the inspection article includes the image of a defect; and determining whether a defect is present in the inspection article using identification results of the identifier.

Each of a plurality of extracted defect images is generated from the defect image by changing an extracting region for extraction from the defect image such that the image of a defect in the defect image is at a different position in the each of the plurality of extracted defect images, the plurality of extracted defect images being provided to the identifier as learning images when teaching the identifier the image of a defect and the image of a non-defect.

Each of the plurality of extracted defect images preferably includes one image that has the image of a defect positioned at a central pixel position thereof, and a plurality of images that each has the image of a defect positioned away from the central pixel position thereof by a predetermined distance in a vertical direction and a horizontal direction.

The extracted inspection images are preferably images obtained by shifting an extracting region for the extracted inspection images across an entirety of the inspection image. The extracting region for each of the extracted inspection images preferably overlaps an extracting region for at least one other extracted inspection image of the extracted inspection images.

Each of the plurality of extracted defect images and each of the extracted inspection images are identical in size. The extracting region for each of the extracted inspection images is preferably shifted a predetermined shift distance from the extracting region for at least one other extracted inspection image in a vertical direction or a horizontal direction. The shift distance for each of the extracted inspection images is preferably less than or equal to a shift amount of positions of the image of a defect farthest away from each other in the plurality of extracted defect images in both the vertical direction and the horizontal direction of each of the plurality of extracted defect images and each of the extracted inspection images.

Each of the plurality of extracted defect images preferably includes one image that has the image of a defect positioned at a central pixel position thereof, and a plurality of images that each has the image of a defect positioned away from the central pixel position thereof by an integer multiple of a predetermined distance in a vertical direction and a horizontal direction. A total number of the plurality of extracted defect images is preferably adjusted by adjusting an integer of the integer multiple and the predetermined distance.

Each of the plurality of extracted defect images preferably includes one image that has the image of a defect positioned at a central pixel position thereof, and a plurality of images that each has the image of a defect positioned away from the central pixel position thereof by an integer multiple of a predetermined distance in a vertical direction and a horizontal direction. The shift distance for shifting the extracting region for each of the extracted inspection images is preferably larger than the predetermined distance for each of the plurality of extracted defect images.

The learning images used to teach the identifier the image of a defect and the image of a non-defect preferably include, in addition to the plurality of extracted defect images, a plurality of non-defect images that do not include an image of a defect and have a size identical with each of the plurality of extracted defect images. An image among the extracted inspection images in which identification results by the identifier and standard compliance determination results determined according to preset inspection standards are different is preferably provided to the identifier as the learning image to teach the identifier, together with the standard compliance determination results.

A size of the extracting region for each of the plurality of extracted defect images is preferably adjusted according to a size of the image of a defect in the defect image without changing a pixel number of each of the plurality of extracted defect images, or the size of the extracting region for each of the plurality of extracted defect images is adjusted according to a size of the image of a defect in the defect image by changing the pixel number of each of the plurality of extracted defect images.

Another aspect of an embodiment of the present invention is a defect inspection method for inspecting a defect in an inspection article through use of an identifier unit configured to identify an image of a defect in an inspection image of the inspection article. The defect inspection method includes: acquiring a defect image of an article different from an inspection article and a defect-free image of the article different from the inspection article in order to teach the identifier unit, the defect image including an image of a defect, and the defect-free image not including the image of a defect; teaching the identifier unit the image of a defect using the defect image and the defect-free image; causing the identifier unit that has learned the images of a defect to identify whether each of extracted inspection images obtained by segmenting the inspection image of the inspection article includes the image of a defect; and determining whether a defect is present in the inspection article using identification results of the identifier unit, in which the identifier unit includes: a first identifier that identifies whether each of the extracted inspection images includes an image of a prospective defect that is potentially a defect; and a second identifier that identifies whether the extracted inspection image identified by the first identifier, as including the image of a prospective defect includes an image of a pseudo-defect that is similar to the image of a defect but not classified as the image of a defect, or the image of a defect, the prospective defect including the defect and the pseudo-defect, the learning image used for teaching the first identifier including an image that includes an image of a prospective defect and an image that does not include the image of a prospective defect, and the learning image used for teaching the second identifier including an image that includes an image of a pseudo-defect and an image that includes the image of a defect.

Yet another aspect of an embodiment of the present invention is a defect inspection device for inspecting a defect in an inspection article through use of an identifier that is configured to identify an image of a defect in an inspection image of the inspection article. The defect inspection device includes: an identifier configured to be provided with an image and identifies the image of a defect in the provided image; an image acquisition unit configured to acquire a defect image including an image of a defect and a defect-free image not including an image of a defect for an article different from an inspection article for teaching the identifier; a first processing unit configured to teach the identifier the image of a defect and an image of a non-defect that is not a defect using the defect image and the defect-free image; a second processing unit configured to cause the identifier that has learned the image of a defect and an image of a non-defect to identify whether each of extracted inspection images obtained by segmenting the inspection image of the inspection article includes the image of a defect; and a third processing unit configured to determine whether a defect is present in the inspection article using identification results of the identifier.

The first processing unit is configured to provide the identifier with, as learning images, a plurality of extracted defect images generated from the defect image by changing an extracting region for extraction from the defect image such that the image of a defect in the defect image is at a different position in each of the plurality of extracted defect images.

Yet another aspect of an embodiment of the present invention is a defect inspection device for inspecting a defect in an article through use of an identifier that is configured to identify an image of a defect in an inspection image of the article. The defect inspection device includes: an identifier unit configured to be provided with an image and identifies the image of a defect in the provided image; an image acquisition unit configured to acquire a defect image including an image of a defect and a defect-free image not including an image of a defect for an article different from the inspection article for teaching the identifier unit; a first processing unit configured to teach the identifier unit the image of a defect using the defect image and the defect-free image; a second processing unit configured to cause the identifier unit that has learned the image of a defect and an image of a non-defect to identify whether each of extracted inspection images obtained by segmenting the inspection image of the inspection article includes the image of a defect; and a third processing unit configured to determine whether a defect is present in the inspection article using identification results of the identifier unit.

The identifier unit includes at least a first identifier and a second identifier. The first identifier is configured to identify whether each of the extracted inspection images includes an image of a prospective defect that is potentially a defect. The second identifier is configured to identify whether an extracted inspection image identified by the first identifier, as including an image of a prospective defect includes an image of a pseudo-defect that is similar to the image of a defect but not classified as the image of a defect, or the image of a defect. The prospective defect includes the defect and the pseudo-defect. The learning image used for teaching the first identifier includes an image that includes an image of a prospective defect and an image that does not include the image of a prospective defect. The learning image used for teaching the second identifier includes an image that includes an image of a pseudo-defect and an image that includes the image of a defect.

The defect inspection method and defect inspection device described above can efficiently identify various types of defects in an article.

DETAILED DESCRIPTION

Figure 1:
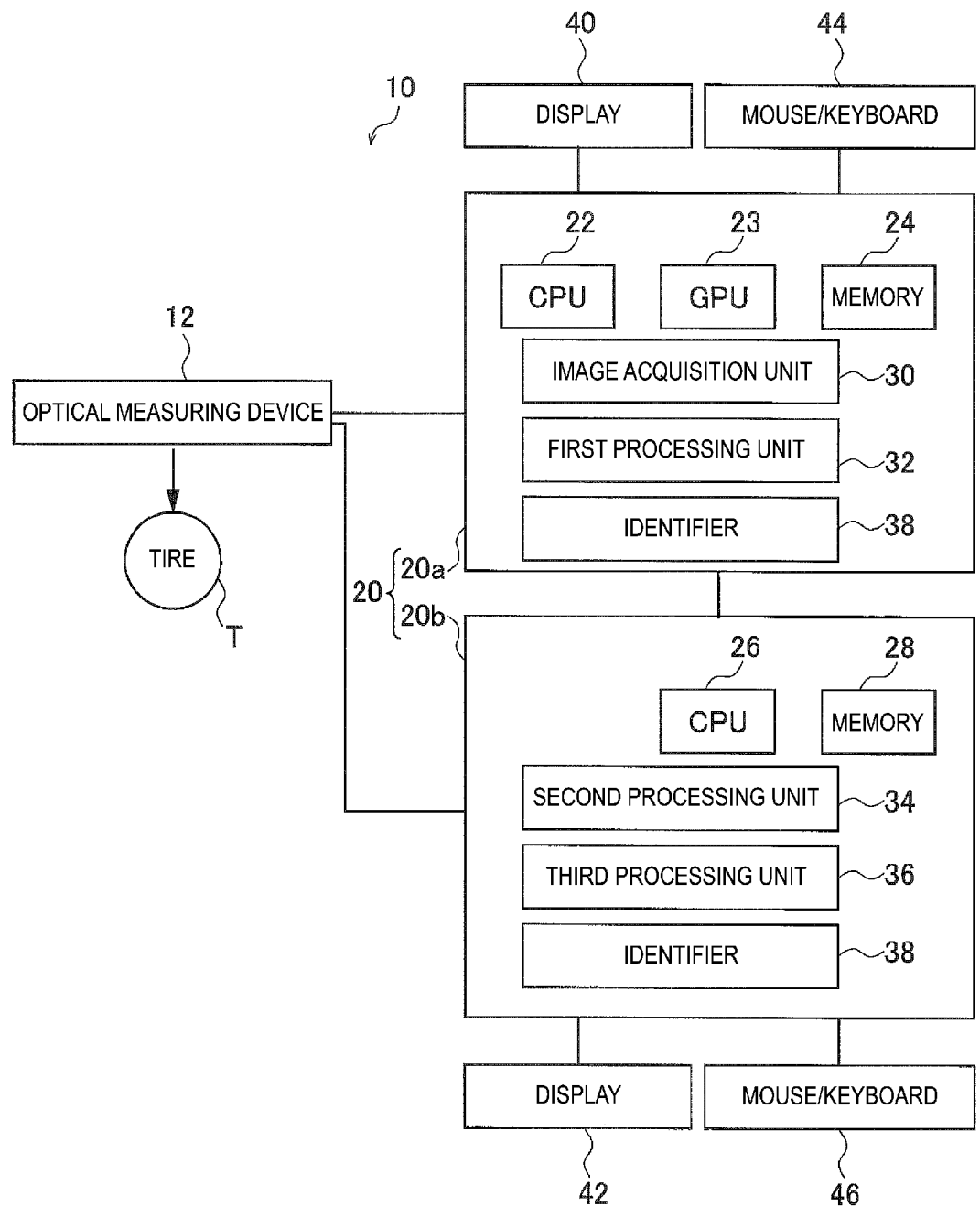
FIG. 1 is a block diagram illustrating the configuration of a defect inspection system for inspecting defects in a tire according to an embodiment.

A defect inspection method and a defect inspection device according to one embodiment of the present technology will be described below in detail. FIG. 1 is a block diagram illustrating the configuration of a defect inspection system 10 for inspecting a defect in a tire according to one embodiment. In the defect inspection system 10, a tire is the inspected article, but the inspected article is not limited to a tire and may be any article immediately after manufacture.

The defect inspection system 10 includes a measuring device 12 and a defect inspection device 20. The measuring device 12 measures the inner surface shape of a tire T to acquire data on the tire T. The defect inspection device 20 uses the acquired data to determine whether a defect is present in the tire T on the basis of an inspection image of the tire T.

Figure 2A:
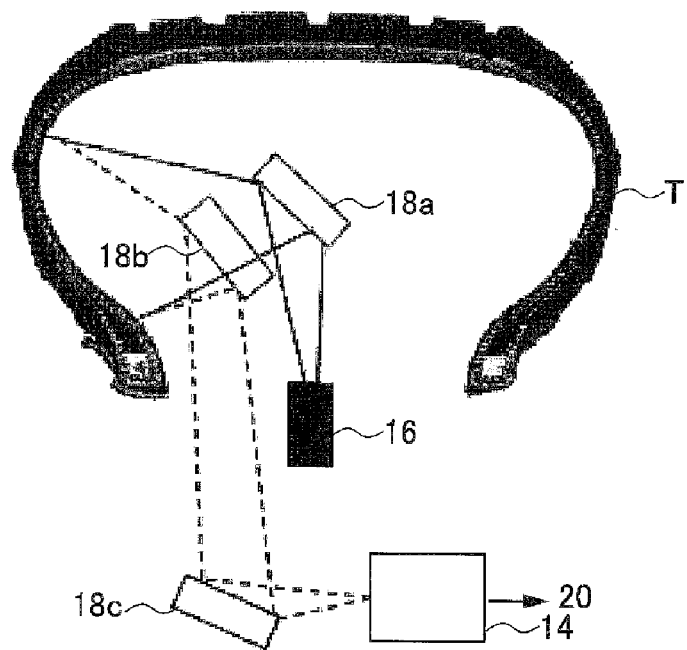
FIGS. 2A and 2B are diagrams illustrating an example of a measuring device for measuring a tire inner surface.
Figure 2B:
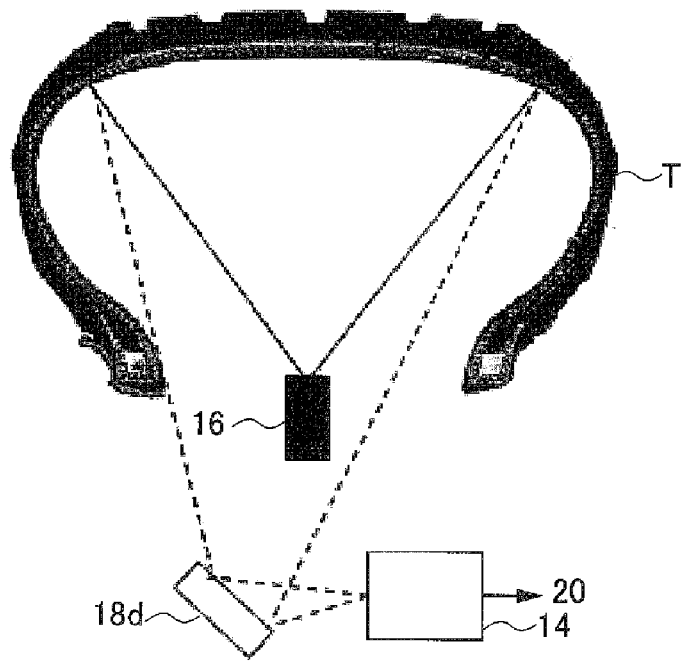

FIGS. 2A and 2B are diagrams illustrating an example of the measuring device 12 for measuring the inner surface of the tire T. The phrase "inner surface of the tire T" refers to a surface facing the tire cavity region that is surrounded by a rim on which the tire T is mounted, and generally refers to the surface on which the inner liner is provided.

The measuring device 12 mainly includes a camera 14, a light source 16 and mirrors 18a to 18d.

The measuring device 12 uses, for example, a light section method. With the light section method, the inner surface shape of the tire T is measured by irradiating the inner surface of the tire T with slit light from the light source 16 and imaging the slit light on the inner surface of the tire T with the camera 14, which is inclined at a predetermined angle. A tire T is rotated about a rotation axis in the tire circumferential direction and the inner surface shape of the tire T is continuously measured to acquire measurement data on the entire inner surface of the tire T.

FIG. 2A is a diagram illustrating an example where a portion of the tire T inner surface corresponding to a sidewall portion is measured. In this case, the slit light emitted from the light source 16 reflects off the mirror 18a to change direction and irradiates the portion of the inner surface corresponding to the sidewall portion. An image of the slit light incident on the inner surface is imaged by the camera 14 via the mirrors 18b and 18c. The mirror 18b and the optical path of the slit light are mutually offset in the tire circumferential direction such that the mirror 18b is not located on the optical path of the slit light.

FIG. 2B is a diagram illustrating an example where a portion of the tire T inner surface corresponding to a tread portion is measured. In this case, the portion of the inner surface corresponding to the tread portion is irradiated with the slit light emitted from the light source 16. An image of the irradiated slit light is captured by the camera 14 via the mirror 18d. When this image is captured, the positions of the light source 16 and the mirror 18d are mutually offset in the tire circumferential direction such that the light source 16 does not enter the imaging field of the camera 14.

Measurement data obtained through this measurement is sent to the defect inspection device 20.

The following exemplary dimensions are set when measuring the inner surface of the tire T. In a case where, for example, the defect has minimum length/width dimensions of 0.5 mm and minimum dimensions in the concave/convex direction of 0.1 mm, the resolution of the camera 14 and the tire rotation speed are set such that the resolution of the image in the tire lateral direction and the tire circumferential direction is, for example, approximately 0.1 mm so that the shape of the defect is reflected in the image. The resolution in the concave/convex direction is defined by the resolution of the camera 14 and the angle between the camera 14 and the slit light. The resolution is set to, for example, approximately 0.02 mm. When measuring the entire inner surface of the tire T with this configuration, an image with approximately 20000 pixels in the tire circumferential direction and approximately 1500 pixels in the tire lateral direction is obtained for each portion A to C (see FIG. 3) to be described later in which the inner surface of the tire T is imaged.

The defect inspection device 20 is a device that determines the presence of a tire defect through the use of an identifier that identifies an image of a defect or an image of a non-defect in an inspection image of the tire. The defect inspection device 20 includes a processing device 20a, which is a computer including a CPU 22, a graphics processing unit (GPU) 23 and a memory 24, and a processing device 20b, which is a computer including a CPU 26 and a memory 28. The processing device 20a has the function of causing an identifier 38 to learn the image of a defect or the image of a non-defect (described later). The processing device 20b has the function of reproducing the identifier 38 that has learned these images to inspect for a tire defect using the inspection image of the tire. The processing device 20a is connected to an input operation system 44 including, for example, a display 40 and a mouse and keyboard. The processing device 20b is connected to an input operation system 46 including, for example, a display 42 and a mouse and keyboard.

A plurality of programs are stored in the memory 24 and the memory 28. The computer calls up and activates one program from the memory 24 to form an image acquisition unit 30, a first processing unit 32, and the identifier 38 to realize the processing device 20a. The computer calls up and activates one program from the memory 28 to form a second processing unit 34, a third processing unit 36 and the identifier 38 to realize the processing device 20b. The identifier 38 formed by the processing device 20b is a reproduction of the identifier that has learned the image of a defect and the image of a non-defect using the processor 20a.

That is, the image acquisition unit 30, the first processing unit 32, the second processing unit 34, the third processing unit 36 and the identifier 38 are all modules formed by programs, and the functions of these modules are substantially controlled by the CPUs 22, 26 and the GPU 23. According to one embodiment, the defect inspection device 20 is configured with two computers. However, one computer may be used to configure the defect inspection device 20. In addition, according to one embodiment, the image acquisition unit 30, the first processing unit 32, the second processing unit 34, the third processing unit 36 and the identifier 38 may be partially configured with hardware and an integrated circuit such as an application-specific integrated circuit (ASIC).

The identifier 38 uses an image provided by the second processing unit 34 and employs a known machine learning method at a portion of that image at which an image of a defect or an image of a non-defect is to be identified. These images are taught using learning images provided by the first processing unit 32 and information on results as to whether images of a defect are present in the learning images. The identifier 38 is a unit that learns the images of a defect and the images of a non-defect images using, for example, a neural network. It is preferred that the identifier 38 use, for example, a convolutional neural network, which is widely used for image recognition.

The image acquisition unit 30 acquires defect images that include an image of a defect and defect-free images that do not include an image of a defect. These imaged are of tires different from the tire to be inspected and are used to teach the identifier 38.

Figure 3:
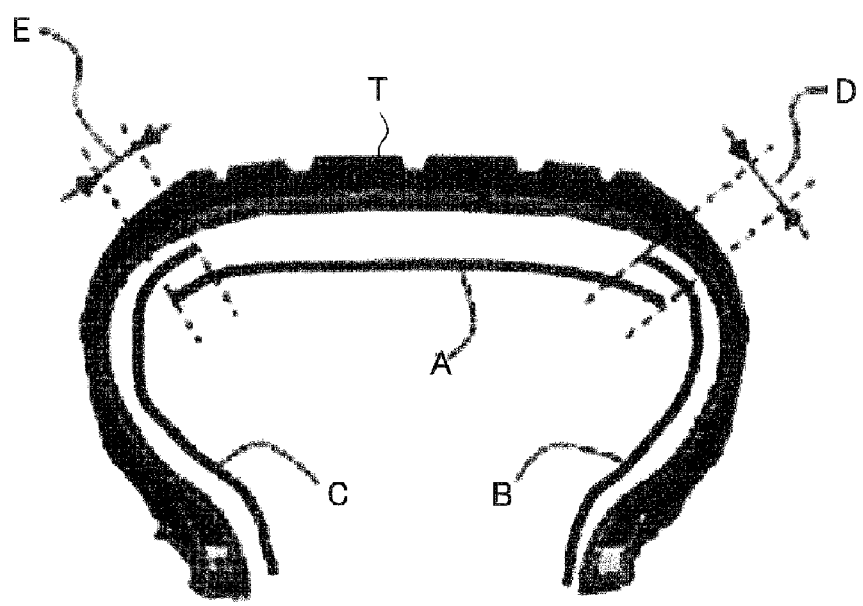
FIG. 3 is a diagram illustrating an example of a measured portion on a tire inner surface.

More specifically, the image acquisition unit 30 generates an image of the inner surface of the tire T using the measurement data on the tire T obtained as results of measurement by the measuring device 12. FIG. 3 is a diagram illustrating an example of a measured portion of the inner surface of the tire T. As illustrated in FIG. 3, the inner surface of the tire T is measured at a portion A corresponding to a tread portion, and at portions B and C corresponding to sidewalls. The inner surface of the tire T is measured in a manner that creates portions D and E at which the portion A and the portion B or C partially overlap.

The image acquired by the image acquisition unit 30 is an image in which positions are expressed on an XY orthogonal coordinate system in which the tire lateral direction and the tire circumferential direction along the inner surface of the tire T are defined as the X direction and the Y direction, respectively. Further, values of these positions in the concave/convex direction (height direction) are represented as pixel values.

The image acquisition unit 30 filters the acquired image. The generated image includes a component of the curved shape of the inner surface of the tire T (curved component). Therefore, it is preferable to remove the curved component from the image in advance. The identifier 38 learns images of defects that are minute irregularities on the inner surface of the tire T and images of non-defects that are not defects, and identifies images of defects in supplied inspection images. Therefore, the curved component is preferably not included in the learning images and the inspection images to increase the accuracy of identifying images of defects that are irregularities. Thus, the image acquisition unit 30 removes the curved component by filtering the image.

In the filtering performed by the image acquisition unit 30, an image is subjected to, for example, median filtering and average filtering to extract an image of the curved component. Then, the pixel value of this image is subtracted from the pixel value of the image before filtering to obtain the removed value of the curved component. Filtering for removing the curved component is not always required to identify an image of a defect. However, it is preferable to use filtered images as the learning images or the inspection images used for inspecting an image of a defect to increase accuracy of inspecting defects.

As described above, the image acquisition unit 30 acquires the defect image including an image of a defect and the defect-free image that has no image of a defect of a tire different from the tire to be inspected, and these images are used to teach the identifier 38. Examples of such images are illustrated in FIGS. 4 to 6.

Figure 4A:
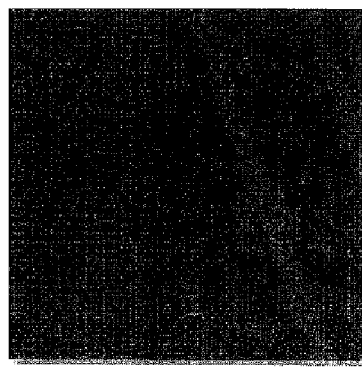
FIGS. 4A to 4C are diagrams illustrating examples of images with no image of a defect.
Figure 4B:
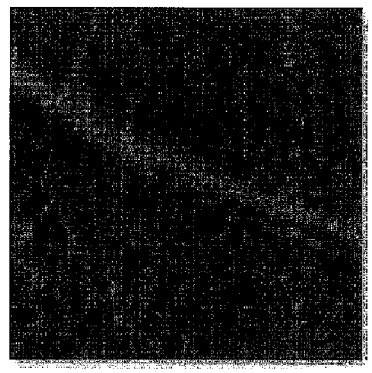
Figure 4C:
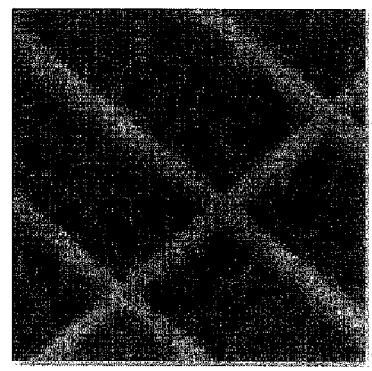
Figure 5A:
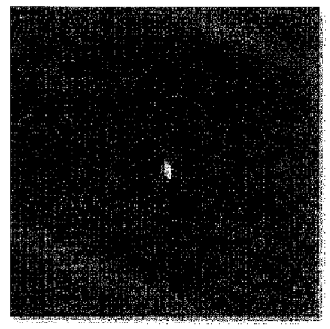
FIGS. 5A to 5C are diagrams illustrating examples of images including an image of a pseudo-defect that is not classified as an image of a defect.
Figure 5B:
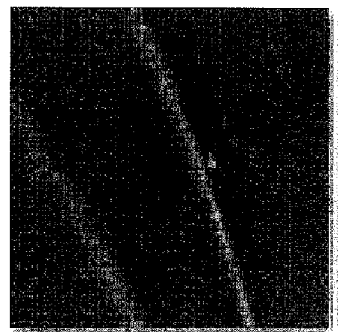
Figure 5C:
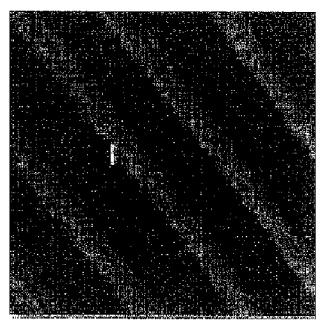
Figure 6A:
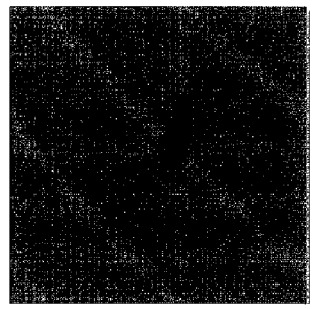
FIGS. 6A to 6C are diagrams illustrating examples of images including an image of a defect.
Figure 6B:
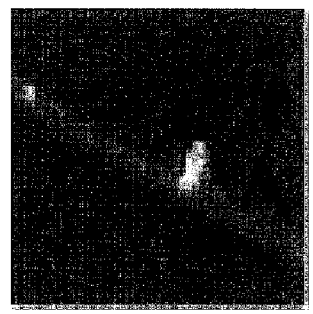
Figure 6C:
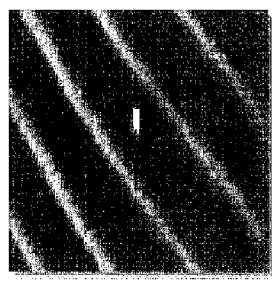

FIGS. 4A to 4C are diagrams illustrating examples of images with no image of a defect. FIGS. 5A to 5C are diagrams illustrating examples of images including an image of a pseudo-defect that is similar to an image of a defect but not classified as an image of a defect. FIGS. 6A to 6C are diagrams illustrating examples of images including an image of a defect.

These images are generated as extracted defect images, which are the learning images to be described below, or extracted inspection images used by the identifier 38 to inspect for an image of a defect.

The first processing device 32 of the processing device 20a and the second and third processing devices 34 and 36 of the processing device 20b are units that prepare images used by the identifier 38 to learn and identify the images of a defect and the images of a non-defect, or compile the identification results of the images of a defect.

Figure 7:
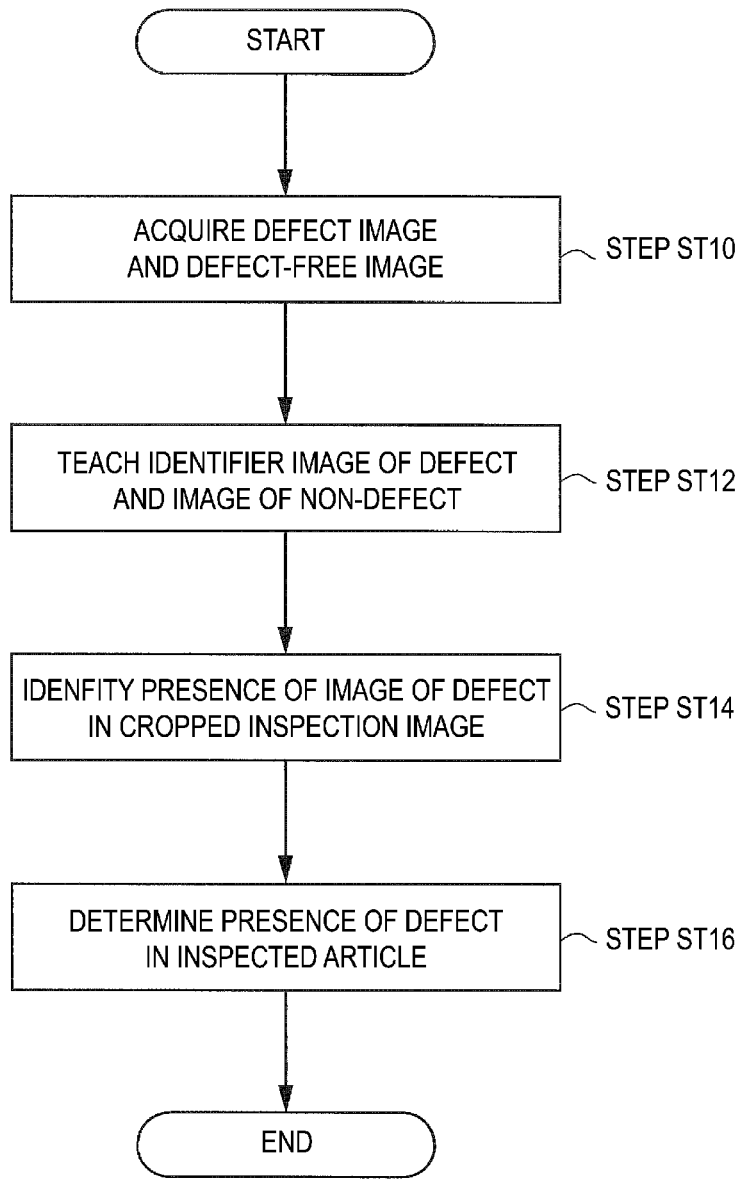
FIG. 7 is a diagram illustrating the flow of a defect inspection method according to an embodiment performed by a defect inspection device.

FIG. 7 is a diagram illustrating a defect inspection method according to an embodiment performed by the defect inspection device 20. The defect inspection method according to the embodiment illustrated in FIG. 7 will be described while explaining the functions of the first processing unit 32, the second processing unit 34, the third processing unit 36 and the identifier 38.

The image acquisition unit 30 uses the filtering described above to acquire defect images that include an image of a defect and defect-free images that do not include an image of a defect of a tire different from the tire to be inspected for teaching the identifier 38 (Step ST10).

Next, the first processing unit 32 uses the acquired defect images and defect-free images to cause the identifier 38 to learn images of defects and images of non-defects that are not defects (Step ST12).

More specifically, the first processing unit 32 provides the identifier 38 with a plurality of extracted defect images. Each of the extracted defect images is created by changing an extracting region for extraction from the defect image such that the image of a defect in the defect image is at a different position. These extracted defect images are used by the identifier 38 as the learning images. Here, each of the provided learning images is, for example, a 256 by 256 pixel count gray scale image with, for example, 256 levels of luminosity.

In the first processing unit 32, creating each of the plurality of extracted defect images from the defect images by changing the extracting region such that the image of a defect in the defect image is at a different position is performed to prevent the identifier 38 from learning that the image of a defect is at a predetermined position in the defect image. While the probability a defect occurring is low and thus the total number of defect images is small, the total number of extracted defect images used as the learning images can be increased to approximate the number of extracted defect-free images generated from the defect-free images. Therefore, images of a defect can be identified with high accuracy.

According to one embodiment, one extracted defect image preferably includes one image in which the position of the image of a defect (central position of image of a defect) is at a central pixel position in the extracted defect image, and a plurality of images in which the position of the image of a defect is separated from the central pixel position in the extracted defect image by a predetermined distance in the vertical direction and the horizontal direction. According to an embodiment, the predetermined distance is preferably a distance that is an integer multiple of a reference distance expressed as a pixel value. For example, a distance of 1, 2, 3, . . . , 8 times the reference distance corresponding to five pixels is set as the predetermined distance. The total number of integers used for the integer multiple of the reference distance is referred to as a number of slides. If the integer is 1, 2, 3, . . . , 8 times, the number of slides is eight. Thus, the same image of a defect will be present at multiple positions in a plurality of extracted defect images. For example, if the number of slides is 8, the same image of a defect moves to 16 different positions excluding the central pixel position of the extracted defect image in the horizontal direction and the same image of a defect moves to 16 different positions excluding the central pixel position of the extracted defect image in the vertical direction. Thus, a total of 17 by 17 extracted defect images are generated from one defect image.

Figure 8A:
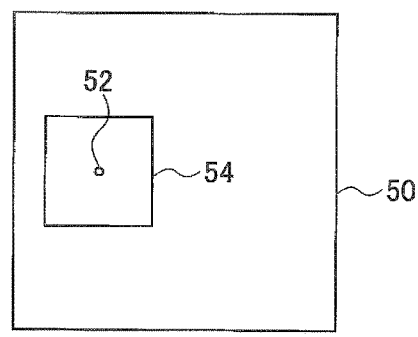
FIGS. 8A to 8D are diagrams for schematically illustrating an extracted defect image.
Figure 8B:
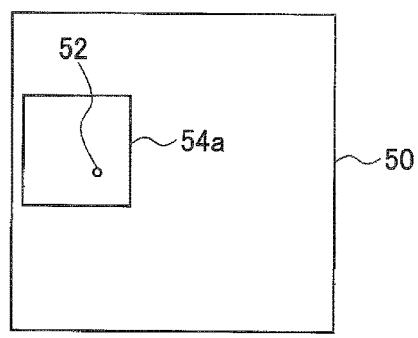
Figure 8C:
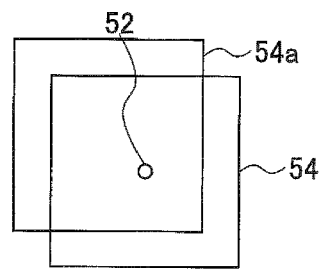
Figure 8D:
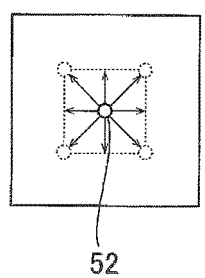

FIGS. 8A to 8D are diagrams for schematically illustrating an extracted defect image. FIG. 8A illustrates an example in which an extracting region 54 is arranged such that an image of a defect 52 in a defect image 50 (center of the image of a defect 52) is at the center pixel position of the extracted defect image. FIGS. 8B and 8C illustrate examples in which an extracting region 54a is shifted to an upper left side relative to the extracting region 54 illustrated in FIG. 8A such that the image of a defect 52 (center of the image of a defect 52) is at a lower right position of the extracted defect image. Thus, as illustrated in FIG. 8D, from the plurality of extracted defect images, it is possible to create an extracted defect image in which the position of the image of a defect 52 has shifted from the center pixel position of the extracted defect image 54 in the vertical direction and the horizontal direction by a predetermined distance.

For example, if a defect image includes a total of 10 images of a defect, a total of 2890 extracted defect images can be created by setting the predetermined distance of the image of a defect as each of the distances that are 1 times, 2 times, 3 times, . . . , 8 times the reference distance corresponding to 5 pixels.

Thus, according to an embodiment, the total number of extracted defect images is preferably adjusted by adjusting the reference distance or the predetermined distance and the number of slides (total number of integers used as integer multiple). Because the number of extracted defect images can be increased in this manner, the total number of extracted defect images can be adjusted so as to approximate the total number of extracted defect-free images, even when defects hardly occur and the total number of defects is small.

The identifier 38 learns the images of defects and images of non-defects using the extracted defect images and the extracted defect-free images provided to the identifier 38 and information on the presence of a defect. Learning information used by the identifier 38 in the processing device 20a that has learned the images is transferred to the processing device 20b, and the identifier 38 in the processing device 20b is reproduced as the identifier that has been subject to machine learning. In the processing device 20b, the second processing unit 34 provides extracted inspection images, and the identifier 38 identifies the presence of an image of a defect in the extracted inspection images (Step ST14).

Figure 9:
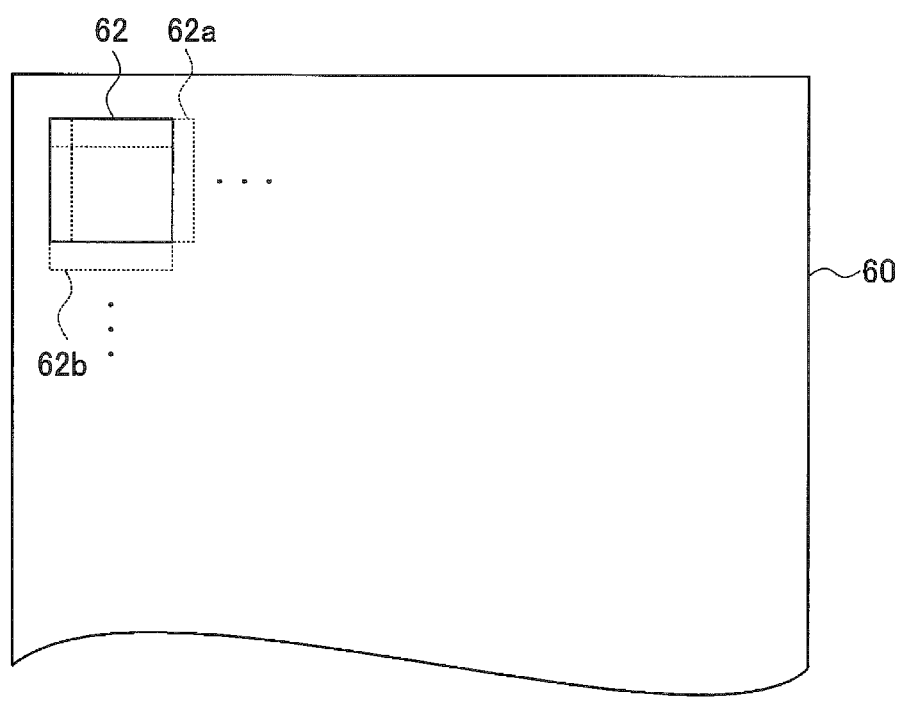
FIG. 9 is a diagram illustrating the relationship between an inspection image and an extracted inspection image according to an embodiment.

In the processing device 20b, the second processing unit 34 generates the extracted inspection images from the acquired inspection images. An extracted inspection image is an image in which all extracting regions of the inspection image that cover the entire inner surface of the tire are changed and extracted. An inspection image is an image obtained when the image acquisition unit 30 measures the inner surface of the tire T to be inspected. At this time, according to an embodiment, the second processing unit 34 preferably generates the extracted inspection images so that the extracting region for each of the extracted inspection images partially overlaps the extracting region for at least one of the extracted inspection images. This allows all images of a defect in the inspection image to be inspected. FIG. 9 is a diagram illustrating the relationship between an inspection image and an extracted inspection image according to an embodiment. As illustrated in FIG. 9, in an inspection image 60, an extracting region 62 used to generate each of the extracted inspection images from the inspection image 60 partially overlaps the extracting regions 62a and 62b in at least one of the extracted inspection images.

As illustrated in FIG. 9, according to an embodiment, the extracted defect images generated by the first processing unit 32 and the extracted inspection images generated by the second processing unit 34 have the same size. Further, the extracting region 62 for each of the extracted inspection images is a region that has shifted in the vertical direction or the horizontal direction by a predetermined distance with respect to the extracting regions 62a and 62b for at least one of the extracted inspection images. In this case, the distance for shifting the extracting region 62 for the extracted inspection image is preferably less than or equal to the shift amount (reference distance*(2*number of slides)) of the positions of the image of a defect 52 farthest away from each other in the extracted defect image in both the vertical direction and the horizontal direction of the extracted defect image and the extracted inspection image. With this configuration, an image of a defect at any position in the inspection image falls within an applicable range in the extracted inspection image within the range of movement between positions of the image of a defect in the extracted defect image.

According to an embodiment, it is preferable that the distance for shifting the extracting region 62 for the extracted inspection image generated by the second processing unit 34 be greater than the predetermined distance (distance that is an integral multiple of the reference distance) used for the extracted defect image generated by the first processing unit 32. Because the predetermined distance is at maximum 8 times the reference distance in the example described above, the distance of movement of the extracting region 62 is preferably greater than 8 times the reference distance. With this configuration, the number of extracted inspection images can be reduced, and thus the time required to inspect defects can also shortened.

The third processing unit 36 determines the presence of a defect on the inner surface of the tire T to be inspected using the results of identifying the presence of an image of a defect in the extracted inspection image used by the identifier 38 in the processing device 20b (Step ST16). The extracted inspection image used for identifying the presence of an image of a defect partially overlaps another extracted inspection image in the inspection image 60. Thus, the third processing unit 36 counts the number of defects in consideration of this overlap. The tire T is determined to be defective if there is one defect at any point along the inner surface of the tire T.

Results of inspecting for defects (presence of defect and number of defects) are transmitted to a display 42 and displayed on the display 42. If desired, information of the location of the defect is also displayed. The third processing unit 36 compiles the extracted inspection images into an image of the entire inner surface of the tire T. An extracted inspection image region identified as a region of the integrated image that includes an image of a defect is surrounded by a box and displayed on the display 42.

As described above, the defect inspection device 20 provides the identifier 38 with, as learning images, a plurality of extracted defect images each created from a defect image by modifying the extracting region 54 such that the image of a defect in the defect image is at a different position in each image to cause the identifier 38 to learn the images of a defect and the images of a non-defect. With this configuration, images of various defects can be efficiently identified at any position in an extracted inspection image.

In the embodiment described above, the inner surface of the tire T is inspected, but the outer surface of the tire T including the sidewall, the tread portion or another portion can be inspected.

Note that, of the extracted inspection images supplied to the identifier 38, an image for which the identification result by the identifier 38 and a standard compliance determination result determined on the basis of a predetermined inspection standard are different is preferably provided to the identifier 38 as a learning image along with the standard compliance determination result for teaching the identifier 38. The identifier 38 can be taught as described above to increase the accuracy of identifying images of defects.

In addition, images of defects with various sizes are inspected. Thus, according to an embodiment, the defect images are preferably enlarged depending on the size of the image of the defect in the defective image. When enlarging an image, it is preferable to, for example, adjust the size of the extracting region (change the resolution) without altering the pixel number of the extracted defect image used as the learning image. According to another embodiment, it is preferable to adjust the size of the extracting region (not change the resolution) by changing the pixel number of the extracted defect image used as the learning image. This can increase the accuracy of identifying images of defects. Changing the size of the extracting region 54 and the pixel number in the extracted defect image is performed using the input operation system 44, 46.

In the related art, even when the inner surface of the tire T is inspected by an inspector and determined to be free from defects, irregularities other than surface pattern irregularities (bladder irregularities formed on the inner liner rubber that push the inner surface of a green tire inward during the vulcanization step) may be present on the inner surface of the tire T but not recognized as a defect. Alternatively, an irregularity that has the same characteristics as a defect but is not classified as a defect because the dimensions of the irregularity do not meet certain standards may be present on the inner surface of the tire T. In other words, the inner surface of the tire T may include a pseudo-defect that is an irregularity but not classified as a defect. This pseudo-defect is preferably configured so as not to be identified as an image of a defect by the identifier 38.

Thus, in the learning images provided to the identifier 38 to teach the identifier 38 the images of defects and images of non-defects, images including neither an image of a defect nor an image of a pseudo-defect and images including an image of a pseudo-defect but not an image of a defect are included as extracted defect-free images, and images including an image of a defect are included as extracted defect images.

Figure 10:
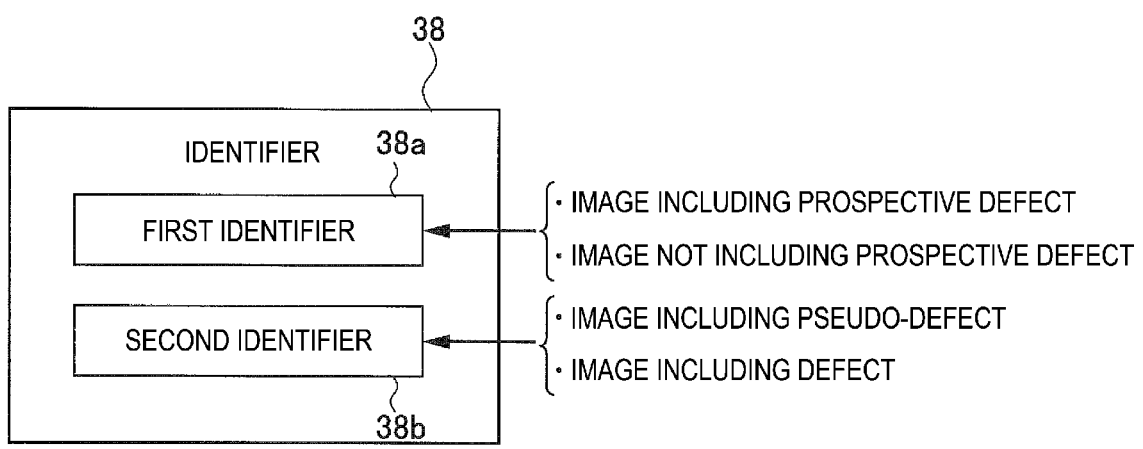
FIG. 10 is a diagram illustrating the configuration of an identifier according to an embodiment.

FIG. 10 is a diagram illustrating the configuration of the identifier 38 according to one embodiment.

According to the embodiment illustrated in FIG. 10, the identifier 38 is an identifier unit including a first identifier 38a and a second identifier 38b. The first identifier 38a and the second identifier 38b are used to identify different images.

More specifically, the first identifier 38a identifies whether an extracted inspection image includes an image of a prospective defect. The image of a prospective defect includes an image of a pseudo-defect. The second identifier 38b identifies, using the first identifier 38a, whether the extracted inspection image identified as including an image of a prospective defect includes an image of a defect or an image of a pseudo-defect that is similar to an image of a defect but not classified as an image of a defect.

As illustrated in FIG. 10, the first processing unit 32 provides the first identifier 38a with an image including an image of a prospective defect and an image not including an image of a prospective defective as learning images for teaching the first identifier 38a. The image of a prospective defect includes the image of a defect and the image of a pseudo-defect. Note that the first identifier 38a treats any identification result other than an identification result by the first identifier 38a that an image does not include an image of a prospective defect as a result that an image includes an image of a prospective defect.

As illustrated in FIG. 10, the first processing unit 32 provides the second identifier 38b with an image including an image of a pseudo-defect and an image including an image of a defect as learning images for teaching the second identifier 38b. The second identifier 38b that has learned these images identifies the image of a prospective defect identified by the first identifier 38a as an image of a defect or an image of a pseudo-defect.

As described above, the identifier 38 identifies defects similar to inspection performed by an inspector in the related art while also inspecting for pseudo-defects that are not treated as defects. Thus, the defect inspection device 20 can perform an inspection similar to that performed by an inspector in the related art.

Experiments were performed to inspect images of defects as described above and the following effects were obtained.

Over hundreds of thousands of learning images including an image of a pseudo-defect but not an image of a defect, learning images including neither an image of a pseudo-defect nor an image of a defect and learning images including an image of a defect were prepared by setting slide numbers and generating extracted images.

The identifier 38 was created and taught that the learning images including an image of a pseudo-defect but not an image of a defect and the learning images including neither an image of a pseudo-defect nor an image of a defect are defect-free images and that the learning images including an image of a defect are defect images. Inspection images including an image of a defect created separately from the learning images were provided to the identifier 38 in the processing device 20b, and the detection rate of images of a defect based on the identification results was found as a detection rate 1. The detection rate 1 is a single stage detection rate achieved by the identifier 38.

Then, the first identifier 38*a* was created and taught that the learning images including neither an image of a pseudo-defect nor an image of a defect do not include a prospective defect and that the learning images including an image of a defect but not an image of a defect and the learning images including an image of a defect include a prospective defect (see FIG. 10). In addition, the second identifier 38*b* was created and taught that the learning images including an image of a pseudo-defect but not an image of a defect do not include a defect and that the learning images including an image of a defect include a defect (see FIG. 10). Inspection images including an image of a defect created separately from the learning images were provided to the first identifier 38*a* and the second identifier 38*b*, and the detection rate of images of a defect based on the identification results by the first identifier 38*a* and the second identifier 38*b* was found as a detection rate 2. The detection rate 2 is a dual-stage detection rate achieved by the first identifier 38*a* and the second identifier 38*b*.

While the detection rate 1 was high, the detection rate 2 rose 14% higher than the detection rate 1. Note that "detection rate" refers to the ratio of inspection images that were correctly detected as including a defect to the total number of inspection images that should be detected as including a defect.

As such, it is evident that images of various different defects not limited to a particular type can be efficiently identified using the identifier 38, or the first identifier 38*a* and the second identifier 38*b*. Additionally, the presence of a defect can be identified with high accuracy even if an irregular pattern is formed on the inner surface of the tire T. The technique according to this embodiment is effective for inspecting defects in articles that have a large shape change factor, such as a tire. While it is difficult to identify defects and pseudo-defects using techniques in the related art, according to the present embodiment, both images of a defect and images of a pseudo-defect can be identified. In particular, with a configuration employing two identifiers such as that illustrated in FIG. 10, the incorrect recognition rate of images of defects can be reduced. Thus, the above-described embodiments are suited to automating inspection of defects in articles including a tire.

The foregoing has been a detailed description of a defect inspection method and a defect inspection device according to an embodiment of the present technology. However, the present technology is not limited to the above embodiments and may be improved or modified in various ways within the scope of the present technology.

The invention claimed is:

1. A defect inspection method for inspecting a defect in an inspection article through use of an identifier that is configured to identify an image of a defect in an inspection image of the inspection article, the method comprising:
acquiring a defect image of an article different from an inspection article and a defect-free image of the article different from the inspection article in order to teach the identifier, the defect image including an image of a defect, and the defect-free image not including the image of a defect;
teaching the identifier the image of a defect and an image of a non-defect that is not the defect using the defect image and the defect-free image;
causing the identifier that has learned the image of a defect and the image of a non-defect to identify whether each of extracted inspection images obtained by segmenting the inspection image of the inspection article includes the image of a defect; and
determining whether a defect is present in the inspection article using identification results of the identifier,
each of a plurality of extracted defect images being generated from the defect image by changing an extracting region for extraction from the defect image such that the image of a same defect in the defect image is at a different position in each of the plurality of extracted defect images, the plurality of extracted defect images being provided to the identifier as learning images when teaching the identifier the image of a defect and the image of a non-defect.

2. The defect inspection method according to claim 1, wherein each of the plurality of extracted defect images includes one image that has the image of a defect positioned at a central pixel position thereof, and a plurality of images that each has the image of a defect positioned away from the central pixel position thereof by a predetermined distance in a vertical direction and a horizontal direction.

3. The defect inspection method according to claim 1, wherein
the extracted inspection images are images obtained by shifting an extracting region for the extracted inspection images across an entirety of the inspection image; and
the extracting region for each of the extracted inspection images overlaps an extracting region for at least one other extracted inspection image of the extracted inspection images.

4. The defect inspection method according to claim 3, wherein
each of the plurality of extracted defect images and each of the extracted inspection images are identical in size;
the extracting region for each of the extracted inspection images is shifted a predetermined shift distance from the extracting region for at least one other extracted inspection image in a vertical direction or a horizontal direction; and
the shift distance for each of the extracted inspection images is less than or equal to a shift amount of positions of the image of a defect farthest away from each other in the plurality of extracted defect images in both the vertical direction and the horizontal direction of each of the plurality of extracted defect images and each of the extracted inspection images.

5. The defect inspection method according to claim 1, wherein
each of the plurality of extracted defect images includes one image that has the image of a defect positioned at a central pixel position thereof, and a plurality of images that each has the image of a defect positioned away from the central pixel position thereof by an integer multiple of a predetermined distance in a vertical direction and a horizontal direction; and
a total number of the plurality of extracted defect images is adjusted by adjusting an integer of the integer multiple and the predetermined distance.

6. The defect inspection method according to claim 4, wherein
each of the plurality of extracted defect images includes one image that has the image of a defect positioned at a central pixel position thereof, and a plurality of images that each has the image of a defect positioned away from the central pixel position thereof by an integer multiple of a predetermined distance in a vertical direction and a horizontal direction; and the shift distance for shifting the extracting region for each of the extracted inspection images is larger than the predetermined distance for each of the plurality of extracted defect images.

7. The defect inspection method according to claim 1, wherein
the learning images used to teach the identifier the image of a defect and the image of a non-defect include, in addition to the plurality of extracted defect images, a plurality of non-defect images that do not include an image of a defect and have a size identical with each of the plurality of extracted defect images; and
an image among the extracted inspection images in which identification results by the identifier and standard compliance determination results determined according to preset inspection standards are different is provided to the identifier as the learning image to teach the identifier, together with the standard compliance determination results.

8. The defect inspection method according to claim 1, wherein a size of the extracting region for each of the plurality of extracted defect images is adjusted according to a size of the image of a defect in the defect image without changing a pixel number of each of the plurality of extracted defect images, or the size of the extracting region for each of the plurality of extracted defect images is adjusted according to a size of the image of a defect in the defect image by changing the pixel number of each of the plurality of extracted defect images.

9. A defect inspection device for inspecting a defect in an inspection article through use of an identifier that is configured to identify an image of a defect in an inspection image of the inspection article, the device comprising:
an identifier configured to be provided with an image and identifies the image of a defect in the provided image;
an image acquisition unit configured to acquire a defect image including an image of a defect and a defect-free image not including an image of a defect for an article different from an inspection article for teaching the identifier;
a first processing unit configured to teach the identifier the image of a defect and an image of a non-defect that is not a defect using the defect image and the defect-free image;
a second processing unit configured to cause the identifier that has learned the image of a defect and an image of a non-defect to identify whether each of extracted inspection images obtained by segmenting the inspection image of the inspection article includes the image of a defect; and
a third processing unit configured to determine whether a defect is present in the inspection article using identification results of the identifier,
the first processing unit configured to provide the identifier with, as learning images, a plurality of extracted defect images generated from the defect image by changing an extracting region for extraction from the defect image such that the image of a same defect in the defect image is at a different position in each of the plurality of extracted defect images.

10. The defect inspection method according to claim 2, wherein
the extracted inspection images are images obtained by shifting an extracting region for the extracted inspection images across an entirety of the inspection image; and
the extracting region for each of the extracted inspection images overlaps an extracting region for at least one other extracted inspection image of the extracted inspection images.

11. The defect inspection method according to claim 10, wherein
each of the plurality of extracted defect images and each of the extracted inspection images are identical in size;
the extracting region for each of the extracted inspection images is shifted a predetermined shift distance from the extracting region for at least one other extracted inspection image in a vertical direction or a right-left direction; and
the shift distance for each of the extracted inspection images is less than or equal to a shift amount of positions of the image of a defect farthest away from each other in the plurality of extracted defect images in both the vertical direction and the horizontal direction of each of the plurality of extracted defect images and each of the extracted inspection images.

12. The defect inspection method according to claim 11, wherein
each of the plurality of extracted defect images includes one image that has the image of a defect positioned at a central pixel position thereof, and a plurality of images that each has the image of a defect positioned away from the central pixel position thereof by an integer multiple of a predetermined distance in a vertical direction and a horizontal direction; and
a total number of the plurality of extracted defect images is adjusted by adjusting an integer of the integer multiple and the predetermined distance.

13. The defect inspection method according to claim 11, wherein
each of the plurality of extracted defect images includes one image that has the image of a defect positioned at a central pixel position thereof, and a plurality of images that each has the image of a defect positioned away from the central pixel position thereof by an integer multiple of a predetermined distance in a vertical direction and a horizontal direction; and
the shift distance for shifting the extracting region for each of the extracted inspection images is larger than the predetermined distance for each of the plurality of extracted defect images.

14. The defect inspection method according to claim 13, wherein
the learning images used to teach the identifier the image of a defect and the image of a non-defect include, in addition to the plurality of extracted defect images, a plurality of non-defect images that do not include an image of a defect and have a size identical with each of the plurality of extracted defect images; and
an image among the extracted inspection images in which identification results by the identifier and standard compliance determination results determined according to preset inspection standards are different is provided to the identifier as the learning image to teach the identifier, together with the standard compliance determination results.

15. The defect inspection method according to claim 14, wherein a size of the extracting region for each of the plurality of extracted defect images is adjusted according to a size of the image of a defect in the defect image without changing a pixel number of each of the plurality of extracted defect images, or the size of the extracting region for each of the plurality of extracted defect images is adjusted according to a size of the image of a defect in the defect image by changing the pixel number of each of the plurality of extracted defect images.

* * * * *